United States Patent [19]
Kruse et al.

[11] Patent Number: 6,007,289
[45] Date of Patent: Dec. 28, 1999

[54] WHEELCHAIR LIFT

[75] Inventors: Thomas Kruse; Jeffrey Moone, both of Sarasota County, Fla.

[73] Assignee: Hoveround Corporation, Sarasota, Fla.

[21] Appl. No.: 09/100,389

[22] Filed: Jun. 19, 1998

[51] Int. Cl.⁶ .................................................. B60P 1/54
[52] U.S. Cl. ...................... 414/462; 414/543; 414/921
[58] Field of Search .................................. 212/180, 306, 212/901; 414/462, 540, 543, 921

[56] References Cited

U.S. PATENT DOCUMENTS

| | | | |
|---|---|---|---|
| 3,048,371 | 8/1962 | Klimek, Jr. ........................ | 212/180 X |
| 3,854,594 | 12/1974 | Brookes . | |
| 4,127,200 | 11/1978 | Mann ................................. | 414/462 X |
| 4,391,379 | 7/1983 | Paffrath .............................. | 212/187 |
| 4,406,574 | 9/1983 | Riley ................................... | 414/543 |
| 4,419,038 | 12/1983 | Pendergraft ........................ | 414/543 |
| 4,746,263 | 5/1988 | Cook .................................. | 414/543 |
| 4,881,864 | 11/1989 | Amato ................................ | 212/180 X |
| 5,090,580 | 2/1992 | Nelson ............................... | 212/180 |
| 5,114,120 | 5/1992 | Bartelt et al. ...................... | 254/323 |
| 5,205,700 | 4/1993 | Lin et al. ............................ | 414/540 |
| 5,431,526 | 7/1995 | Peterson et al. ................... | 414/462 X |
| 5,752,799 | 5/1998 | Carey et al. ....................... | 414/462 X |

*Primary Examiner*—Janice L. Krizek
*Attorney, Agent, or Firm*—A. W. Fisher, III

[57] ABSTRACT

A self propelled personal mobility vehicle lift operable in a stored configuration and a deployed configuration operatively mounted to the rear portion of a vehicle to selectively lift and remove a self propelled personal mobility vehicle into and from the rear portion of the vehicle, the self propelled personal mobility vehicle lift includes a stanchion or tower assembly pivotally mounted to a lift mounting assembly secured to the vehicle, a boom assembly to support a hoist assembly and a lift support assembly to support the self propelled personal mobility vehicle lift when deployed telescopingly coupled to the upper and lower portions of the stanchion or tower assembly respectively, the hoist assembly includes a hoist mechanism having a flexible hoist element to couple the self propelled personal mobility vehicle lift to the self propelled personal mobility vehicle when the self propelled personal mobility vehicle lift is in the deployed configuration to selectively lift or lower the self propelled personal mobility vehicle into or from the rear portion of the vehicle.

44 Claims, 7 Drawing Sheets

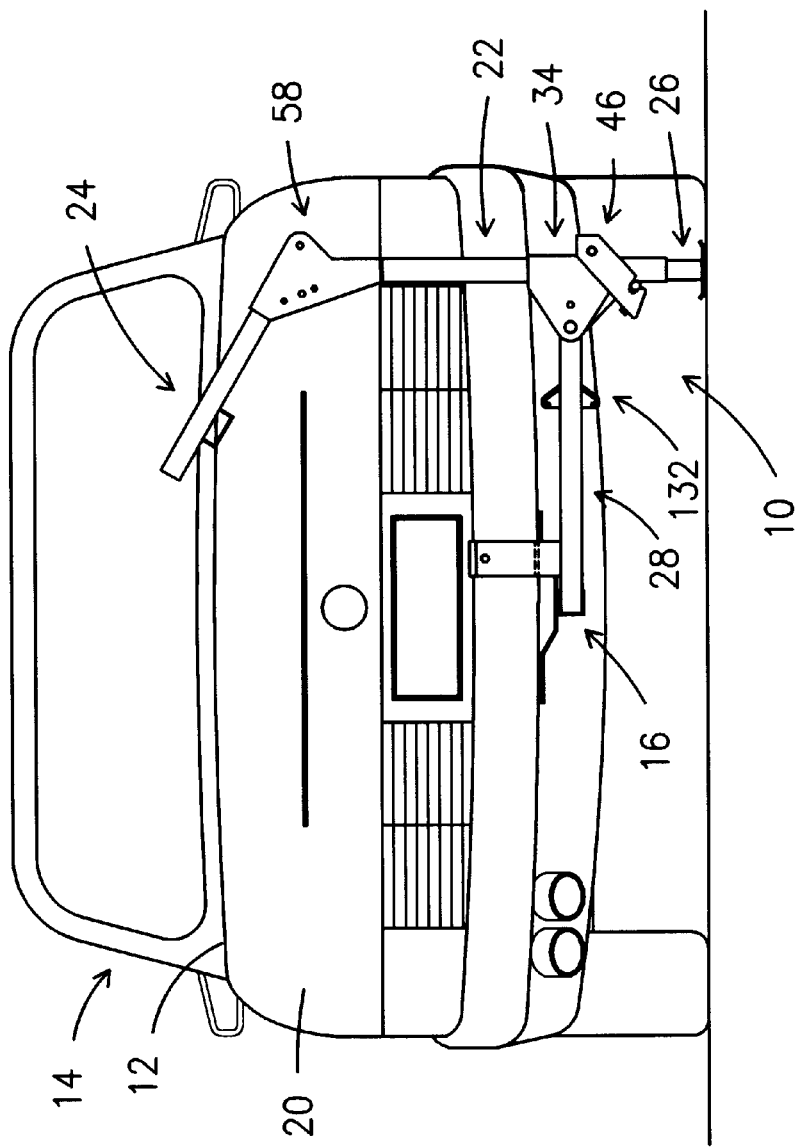

WHEELCHAIR LIFT

BACKGROUND OF THE INVENTION

1. Field of the Invention

A self propelled personal mobility vehicle lift operatively mounted to the rear portion of a vehicle to selectively store a self propelled personal mobility vehicle in the rear of the vehicle.

2. Description of the Prior Art

Numerous lifts and hoists have been designed to maneuver wheelchairs into and out of the rear of vehicles. Unfortunately, such devices generally require extensive electrical wiring, complex mechanical modification and usually occupy a significant portion of limited available trunk space. Thus there exists a need for an externally mounted wheelchair lift requiring a minimum of electrical and mechanical conversion.

U.S. Pat. No. 5,090,580 teaches a portable crane for hoisting electric scooters, wheel-chairs and the like which includes a column assembly, a boom assembly, a base assembly and a winch assembly. The column assembly is removably and pivotally mounted between an opened vehicle trunk lid and a trunk floor. The column assembly includes top and bottom pivot pins which rotatably engage pivot pin receiving holes and about which the boom assembly rotates. The column assembly and boom assembly are collapsible so as to allow the trunk lid to close.

U.S. Pat. No. 4,127,200 discloses an apparatus for hoisting a wheelchair into and out of an enclosure including a swivel base having a stationary section that may be secured within the enclosure and a section rotatable on the stationary section about a vertical axis. A motor mount is positioned above and is connected to the rotatable section of the swivel base. An angled arm is pivotally connected to the motor mount and is capable of standing rigidly upright when in use and capable of folding down when not in use. A cable, attached to a reel at one end, has a series of pulleys located on the angled arm to guide the cable over the angled arm. The reel is formed to the motor mount and is connected to a motor on the motor mount through use of gearing. A hook is formed at the other end of the cable for use in hoisting.

U.S. Pat. No. 4,746,263 shows a telescoping hoist assembly normally stored in the rear bumper area of a pickup truck including a boom telescoping into and out of a mast pivotally anchored at one end of the pickup bumper structure. A power winch operated by the pickup electrical system is axially mounted on the outward end of the boom. With the boom extended out of the mast the cable is connected with the anchored area of the mast for a hoist self erecting action interrupted, when the mast is vertical, by stop members at the base end of the mast. A mast stored jack structure supports hoist loads independently of the pickup suspension system.

U.S. Pat. No. 4,406,574 teaches a device for lifting and loading objects into and out of a storage space of an automobile for transportation thereby. The device is fully contained within the storage space and is adapted to be mounted directly to the chassis of the automobile. The device is particularly suited to assist disabled individuals who may be unable to lift, load and transport such objects otherwise.

U.S. Pat. No. 5,114,120 relates to a system designed to enable equipment mounted on the outside of a motor vehicle to swing away from the mounting point when access to the vehicle is necessary while, at the same time, protecting people in the area from undesired and/or inadvertent operation of the equipment when not properly secured to the mounting point.

U.S. Pat. No. 4,391,379 discloses a lifting device adapted to be mounted within an automobile trunk having a rigid boom mounted for free pivotal movement about both vertical and horizontal axes. The lifting device includes a motordriven lift mounted at the distal end of the boom. A counterbalance member is employed to counterbalance the gravitational force biasing the boom in downward movement about its horizontal axis so that the boom may be easily pivoted upwardly or downwardly by a handicapped person. A prop assembly may be manually moved into position to positively maintain the boom in an elevated lifting position.

U.S. Pat. No. 4,881,864 shows a swingable boom-type hoist which is characterized by a forwardly-projecting tongue of rectangular cross section that telescopes into the box-beam style drawbar of a conventional trailer hitch carried by the load-carrying vehicle thus cooperating therewith to maintain the stanchion from which the tongue projects in an upright position. The boom on the upper end of the stanchion can swing through a complete circle and is preferably vertically adjustable. An important feature is the retractable foot on the lower end of the stanchion which can be raised off the ground while the load in the load-carrying vehicle is transported from one place to another without having to dismount the hoist. A conventional winch is used to raise and lower the load.

U.S. Pat. No. 3,854,594 teaches a collapsible hoisting apparatus comprising an upright member having a shoe at one end and a swivel pin mounted in the shoe and adapted to pivotally seat in a socket. A boom head affixes one end of a boom to the other end of the upright member for rotation from a position in which the boom is parallel to the upright member in the plane of the boom and the upright member to a position in which the boom is at right angles to the upright member in the plane. A trolley device is movably mounted on the boom for movement along the length thereof. A cable winding device is rotatably mounted on the trolley device. A cable having a hook at one end thereof and affixed to the cable winding device at the other end thereof is wound on the cable winding device. A turning device coupled to the cable winding device extends beyond the boom head for selective manual winding and unwinding of the cable.

U.S. Pat. No. 4,419,038 shows a foldable hoist assembly with an elongated column with a boom pivotally mounted at its outer end to be movable from a stored position alongside the column to its operating position. A spindle with radial and thrust bearings in the support column base provides rotary support so that loads suspended from the boom can be swung over and away from the load bed. The base of the support column is also pivotally mounted on a horizontal support structure affixed to the vehicle chassis, preferably in the position of a bumper below the rear edge of the load bed. With boom stored alongside, the support column is rotated from its upright operating position to be supported horizontally within the support structure leaving the load bed unobstructed.

SUMMARY OF THE INVENTION

The present invention relates to a self propelled personal mobility vehicle lift operatively mounted to the rear portion of a vehicle to selectively store and remove a self propelled personal mobility vehicle in and from the trunk of the vehicle.

The self propelled personal mobility vehicle lift comprises a stanchion or tower assembly having a boom assembly and a lift support assembly telescopingly coupled to the upper and lower portions thereof respectively pivotally mounted to a lift mounting assembly and a hoist assembly removably coupled to the boom assembly as described more fully hereinafter.

The stanchion or tower assembly comprises a hollow tower member having a stanchion pivot bracket attached to the lower portion thereof to pivotally mount the stanchion or tower assembly to the lift mounting assembly. A stanchion support aperture is formed through the lower portion of the hollow tower member; while a plurality of stanchion boom apertures is formed through the mid to upper portion of the hollow tower member.

The boom assembly comprises an upper hollow boom member pivotally coupled to a lower hollow boom member by a boom bracket. A boom hoist aperture is formed through the outer portion of the upper hollow boom member; while a boom bracket aperture is formed through the inner portion of the upper hollow boom member. A boom stanchion aperture is formed through the lower portion of the lower hollow boom member. The boom bracket and the upper hollow boom member are rotatably coupled to the lower hollow boom member. The stanchion boom apertures and the boom stanchion aperture together with fastening means cooperatively form a boom stanchion adjustment means to secure the lower hollow boom member longitudinally relative to the hollow tower member by aligning the boom stanchion aperture with one of the stanchion boom apertures and securing the fastening means therethrough to selectively adjust the height of the boom assembly.

The lift support assembly comprises a hollow support member having a support plate attached to the lower portion thereof and a plurality of support stanchion apertures formed through the mid to upper portion thereof. The stanchion support aperture and the support stanchion apertures together with a fastening means cooperatively form a support stanchion adjustment means to secure the hollow support member longitudinally relatively to the hollow tower member by aligning the stanchion support aperture with one of the support stanchion apertures and positioning the fastening means therethrough to selectively adjust the height of the lift support assembly such that the support plate rests on the ground to support the self propelled personal mobility vehicle lift thereon.

The lift mounting assembly comprises a hitch mounting member and a stanchion mounting member disposed substantially perpendicular thereto formed on the outer end portion thereof. The stanchion or tower assembly is pivotally coupled to the stanchion mounting member by the stanchion pivot bracket.

A lift mount securing means is provided to secure and stabilize the self propelled personal mobility vehicle lift to the vehicle mounting means. Specifically, the lift mount securing means comprises a first and second securing assembly extending between the stanchion mounting member and the vehicle or the vehicle mounting means. A first stanchion lock element attached to the stanchion or tower assembly and a second stanchion lock element attached to lift mounting assembly cooperatively from a stanchion lock means to lock the stanchion or tower assembly in position when the self propelled personal mobility vehicle lift is in the deployed configuration.

The hoist assembly comprises a hollow hoist member having a hoist mechanism attached to the outer end portion thereof and a plurality of hoist boom apertures formed through the mid portion thereof. The boom hoist aperture and the hoist boom apertures together with a fastening means cooperatively form a hoist boom adjustment means to secure the hollow hoist member longitudinally relative to the upper hollow boom member by aligning the boom hoist aperture with one of the hoist boom apertures and positioning the fastening means therethrough to selectively adjust the distance of the hoist mechanism from the boom bracket. The hoist mechanism comprises a reel or spool disposed within a hoist housing that supports a reversible electric motor in operative relationship relative to the reel or spool to selectively pay-out or retrieve a flexible hoist element such as a strap or line having a hoist attachment means such as a hook attached to the free end thereof.

A control means operatively couples the hoist assembly to the power source of the self propelled personal mobility vehicle. In particular, the control means comprising the control box having logic means disposed therein to control the operation of the hoist mechanism of the hoist assembly having a control switch mounted thereon to actuate the logic means is coupled between power source and the reversible electric motor.

To install the self propelled Personal mobility vehicle lift, the hitch mounting member is attached to the rear of the vehicle with the stanchion mounting member disposed toward the passenger side and secured in place. The lift mount securing mean is then tighten until the lift mounting assembly is secured tightly against the vehicle.

A self propelled personal mobility vehicle attachment means or docking device may be mounted to the self propelled personal mobility vehicle to detachable couple the flexible hoist element to the self propelled personal mobility vehicle.

The stanchion or tower assembly and the boom assembly are pivoted upward relative to the lift mounting assembly until the stanchion or tower assembly is locked in the deployed position. The upper hollow boom member is then pivoted on the boom bracket.

The boom assembly can be rotated on the stanchion or tower assembly to position the upper hollow boom member near the rear portion of the vehicle. The hollow hoist member is inserted into the upper hollow boom member and secured.

To load the self propelled personal mobility vehicle into the trunk or rear portion of the vehicle, the self propelled personal mobility vehicle is located near the rear portion of the vehicle. The control box is electrically coupled between the reversible electric motor and the charger port of the self propelled personal mobility vehicle.

The hoist attachment means is lowered by operating the reversible electric motor to rotate the reel or spool to pay-out the flexible hoist element until the attachment means can be coupled to the docking device to interconnect the self propelled personal mobility vehicle lift to the self propelled personal mobility vehicle. The self propelled personal mobility vehicle is then lifted by controlling the control switch causing the reversible electric motor to rotate the reel or spool to retrieve the flexible hoist element. Once the self propelled personal mobility vehicle clears the top of the trunk, the hoist assembly is rotated to maneuver the self propelled personal mobility vehicle into the trunk of the vehicle. The self propelled personal mobility vehicle is then lowered into the trunk of the vehicle.

The attachment means is released from the self propelled personal mobility vehicle and the power disconnected. The hoist assembly is removed from the boom assembly and stored in the trunk of the vehicle.

Finally, the boom assembly is collapsed, the stanchion lock means released, and the stanchion or tower assembly, the lift support assembly and the boom assembly returned to the stored position and secured.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 4 is a rear view of the self propelled personal mobility vehicle lift of the present invention with the stanchion or tower assembly, the lift support assembly and the boom assembly in the deployed configuration.

Similar reference characters refer to similar parts throughout the several views of the drawings.

DETAILED DESCRIPTION OF THE PREFERRED EMBODIMENT

Figure 1:
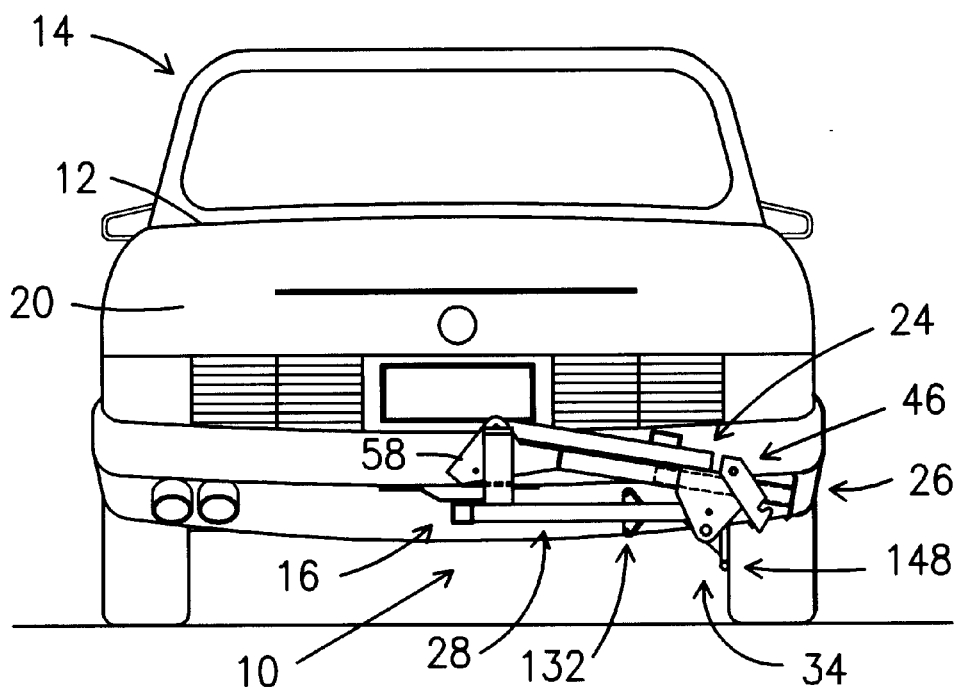
FIG. 1 is a rear view of the self propelled personal mobility vehicle lift of the present invention mounted to the rear of a vehicle in the stored configuration.

AS shown in FIG. 1, the present invention relates to a self propelled personal mobility vehicle lift such as a wheelchair lift generally indicated as 10 configured to be operatively mounted to the rear portion 12 of a vehicle generally indicated as 14 by vehicle mounting means generally indicated as 16, such as a Class 2 square hitch, to selectively store and remove a self propelled personal mobility vehicle such as a wheelchair generally indicated as 18 in and from the trunk 20 or rear portion 12 of the vehicle 14.

Figure 2:
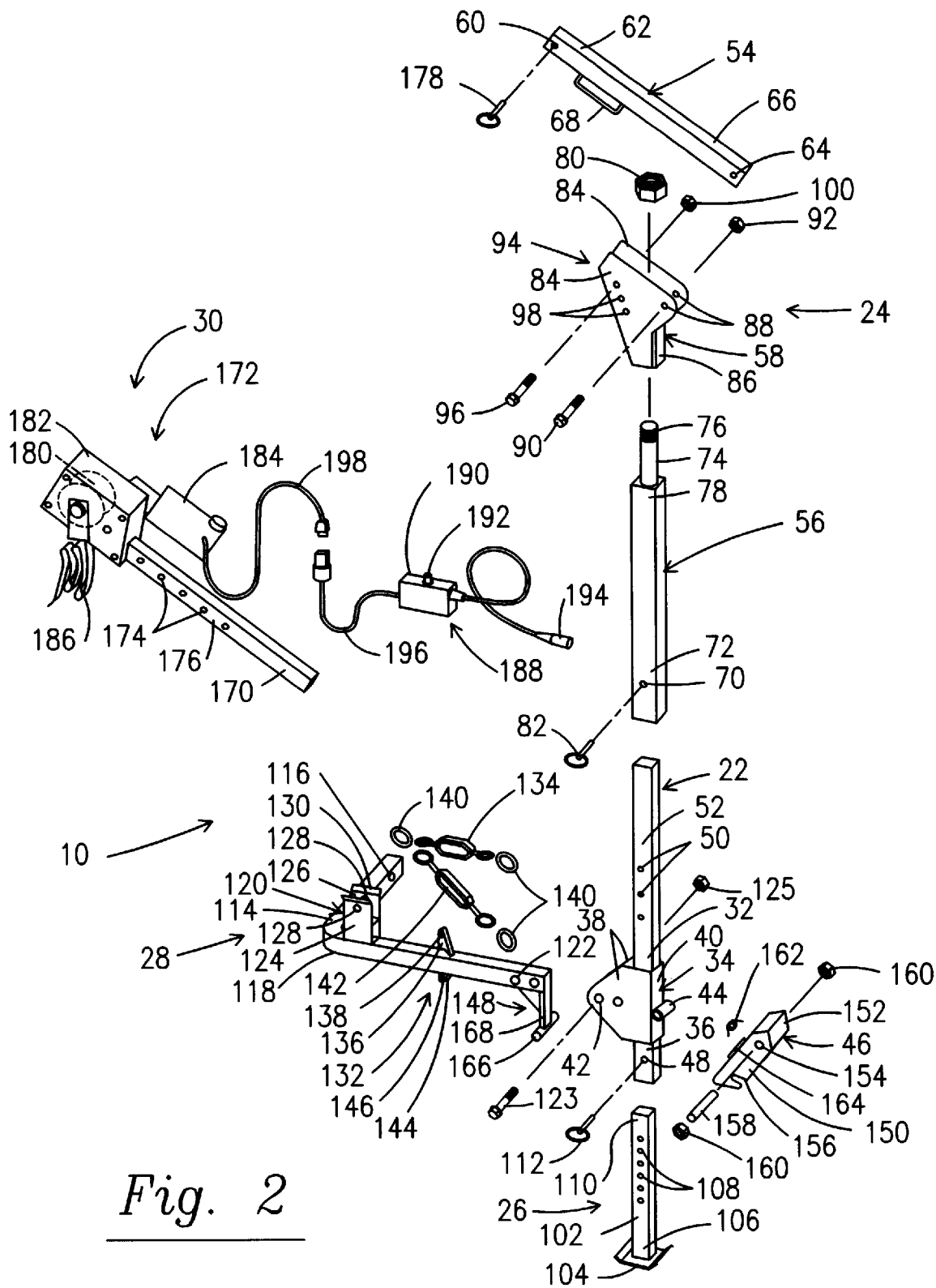
FIG. 2 is an exploded perspective view of the self propelled personal mobility vehicle lift of the present invention.

As best shown in FIG. 2, the self propelled personal mobility vehicle lift 10 comprises a stanchion or tower assembly generally indicated as 22 having a boom assembly generally indicated as 24 and a lift support assembly generally indicated as 26 telescopingly coupled to the upper and lower portions thereof respectively pivotally mounted to a lift mounting assembly generally indicated as 28 and a hoist assembly generally indicated as 30 removably coupled to the boom assembly 24 as described more fully hereinafter.

Figure 7:
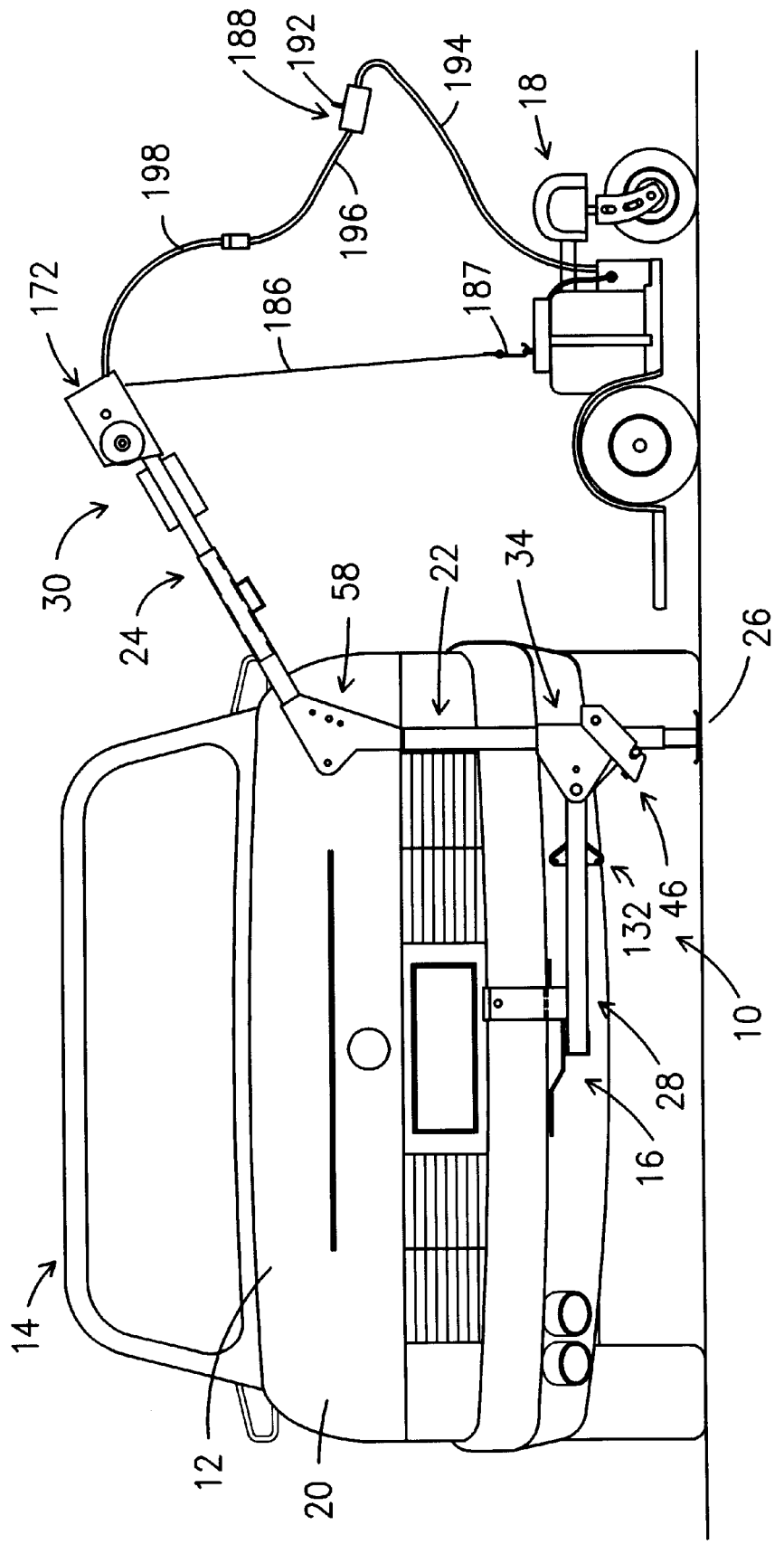
FIG. 7 is a rear view of the self propelled personal mobility vehicle lift of the present invention in the fully deployed configuration.

AS best shown in FIGS. 2 and 7, the stanchion or tower assembly 22 comprises a hollow tower member 32 having a stanchion pivot bracket generally indicated as 34 attached to the lower portion 36 thereof. The stanchion pivot bracket 34 comprises a pair of stanchion bracket side plates each indicated as 38 attached to the opposite sides of the hollow tower member 32; while a stanchion bracket back plate 40 is affixed to the back of the hollow tower member 32. A stanchion bracket aperture 42 is formed on the outer portion of each stanchion bracket side plate 38 in spaced relationship to the hollow tower member 32 to pivotally mount the stanchion or tower assembly 22 to the lift mounting assembly 28 as described more fully hereinafter; while a stanchion lock mounting member or substantially cylindrical pin housing 44 is affixed to the stanchion bracket back plate 40 to pivotally couple a first stanchion lock element generally indicated as 46 described more fully hereinafter. A stanchion support aperture 48 is formed through the lower portion 36 of the hollow tower member 32; while a plurality of stanchion boom apertures generally indicated as 50 is formed through the mid to upper portion 52 of the hollow tower member 32.

AS best shown in FIGS. 2 and 7, the boom assembly 24 comprises an upper hollow boom member 54 pivotally coupled to a lower hollow boom member 56 by a boom bracket generally indicated as 58. A boom hoist aperture 60 is formed through the outer portion 62 of the upper hollow boom member 54; while a boom bracket aperture 64 is formed through the inner portion 66 Of the upper hollow boom member 54. In addition, a boom handle 68 is attached to the outer portion 62 of the upper hollow boom member 54. A boom stanchion aperture 70 is formed through the lower portion 72 of the lower hollow boom member 56; while a boom bracket attachment member 74 including a threaded portion 76 extends outwardly from the upper portion 78 of the lower hollow boom member 56 to cooperatively engage a boom bracket attachment element such as a nut 80 to rotatably couple the boom bracket 58 and the upper hollow boom member 54 to the lower hollow boom member 56. The stanchion boom apertures 50 and the boom stanchion aperture 70 together with fastening means such as a hitchpin 82 cooperatively form a boom stanchion adjustment means to secure the lower hollow boom member 56 longitudinally relative to the hollow tower member 32 by aligning the boom stanchion aperture 70 with one of the stanchion boom apertures 50 and passing the hitchpin 82 therethrough to selectively adjust the height of the boom assembly 24. The boom bracket 58 comprises a pair of boom bracket side plates each indicated as 84 held in substantially parallel spaced relation by a boom bracket back plate 86. A boom bracket aperture 88 is formed through the rear portion of each boom bracket side plate 84. The upper hollow boom member 54 is coupled to the boom bracket 58 by passing a securing means such as a bolt or pin 90 through the boom bracket apertures 88 and the boom bracket aperture 64 securing the upper hollow boom member 54 between the boom bracket side plates 84 by placing a nut 92 or similar securing member to the bolt or pin 90. The boom bracket 58 further includes an upper boom member adjustment means generally indicated as 94 disposed to engage the upper hollow boom member 54 to selectively control the angle or inclination of the upper hollow boom member 54 relative to the lower hollow boom member 56. In particular, the upper boom member adjustment means 94 comprises a stop or limit member 96 such as a bolt or pin extending through one of a plurality of boom adjustment apertures generally indicated as 98 formed through the forward portion of each boom bracket side plate 84 to engage the upper hollow boom member 54 when in the deployed configuration. The stop or limit member 96 may be secured to the boom bracket 58 by a nut 100 or similar securing means.

AS best shown in FIGS. 2 and 7, the lift support assembly 26 comprises a hollow support member 102 having a support plate 104 attached to the lower portion 106 thereof and a plurality of support stanchion apertures generally indicated as 108 formed through the mid to upper portion 110 thereof. The stanchion support aperture 48 and the support stanchion apertures 108 together with a fastening means such as a hitchpin 112 cooperatively form a support stanchion adjustment means to secure the hollow support member 102 longitudinally relatively to the hollow tower member 32 by aligning the stanchion support aperture 48 with one of the support stanchion apertures 108 and passing the hitchpin 112 therethrough to selectively adjust the height of the lift support assembly 24 such that the support plate 104 rests on the ground to support the self propelled personal mobility vehicle lift 10 thereon.

As best shown in FIGS. 2 and 7, the lift mounting assembly 28 comprises a hitch mounting member 114 having a hitch mounting aperture 116 formed on the inner end portion thereof and a stanchion mounting member 118 disposed substantially perpendicular thereto formed on the outer end portion thereof. A stanchion support means generally indicated as 120 and a stanchion mounting aperture 122 are formed on the inner end portion and outer end portion of the stanchion mounting member 118 respectively. A pin or fastening member 123 is passed through the stanchion bracket aperture 42 and the stanchion mounting aperture 122 and secured in place by a nut or fastening means 125 to pivotally couple the stanchion or tower assembly 22 to the lift mounting assembly 28. The stanchion support means 120 comprises a pair of substantially parallel side support plates each indicated as 124 extending upwardly from the stanchion mounting member 118 to receive the hollow tower member 32 when the self propelled personal mobility vehicle lift 10 is in the stored configuration as best shown in FIG. 1. A stanchion support member 126 is disposed between the substantially parallel side support plates 124 to engage the upper portion of the hollow tower member 32 when in the stored configuration to hold the hollow tower member 32 and stanchion mounting member 118 in spaced relationship relative to each other such that the upper hollow boom member 54 is disposed therebetween. A stanchion lock aperture 128 is formed in the upper portion of each side support plate 124 which flares outwardly with a stanchion cam 130 inclined outwardly to guide the upper hollow boom member 54 between the substantially parallel side support plates 124. A pin 131 may be placed through the stanchion lock aperture 128 to secure or lock the self propelled personal mobility vehicle lift 10 in the stored configuration.

A lift mount securing means generally indicated as 132 secures and stabilizes the self propelled personal mobility vehicle lift 10 to the vehicle mounting means 16 and the vehicle 14. Specifically, the lift mount securing means 132 comprises a first and second securing assembly. The first securing assembly comprises a first adjustable interconnecting member 134 such as a turnbuckle coupled between a first securing plate 136 having a securing aperture 138 formed therethrough extending upwardly from the stanchion mounting member 118 and the vehicle 14 or the vehicle mounting means 16 by a connector 140 such as a ring attached to each end portion thereof. The second securing assembly, similarly constructed, comprises a second adjustable interconnecting member 142 such as a turnbuckle coupled between a second securing plate 144 having a securing aperture 146 formed therethrough extending downwardly from the stanchion mounting member 118 and the vehicle 14 or the vehicle mounting means 16 by a connector 140 such as a ring attached to each end portion thereof.

A second stanchion lock element generally indicated as 148 is formed on the outer end portion of the stanchion mounting member 118 adjacent the stanchion mounting aperture 122. The first stanchion lock element 46 and the second stanchion lock element 148 cooperatively form a stanchion lock means to lock the stanchion or tower assembly 22 in position when the self propelled personal mobility vehicle lift 10 is in the deployed configuration.

As best shown in FIG. 2, the first stanchion lock element 46 comprises a pair of stanchion lock side plates each indicated as 150 held in substantially parallel spaced relation by a stanchion lock back plate 152. A stanchion lock aperture 154 is formed through one end portion of each of the stanchion lock side plates 150; while a lock notch 156 is formed on the opposite end portion thereof to engage the second stanchion lock element 148 as described more fully hereinafter. The first stanchion lock element 46 is pivotally coupled to the stanchion pivot bracket 34 of the stanchion or tower assembly 22 by passing a securing means 158 such as a pin or bolt through the stanchion lock aperture 154 and the stanchion lock mounting member or substantially cylindrical pin housing 44 securing the first stanchion lock elements 46 to the stanchion pivot bracket 34 of the stanchion or tower assembly 22 by placing a nut 160 or similar securing member to the bolt or pin 158 with the stanchion lock side plates 150 being disposed on opposite sides of the tower member 32 of the stanchion or tower assembly 22. A positioning means such as a spring or other bias means 162 is operatively coupled to the first stanchion lock element 46 by the securing means 158 to engage the hollow tower member 32 of the stanchion or tower assembly 22 and the stanchion lock back plate 152 of the first stanchion lock element 46 in a first or locked position. A lock movement member or tab 164 is formed on the first stanchion lock element 46 to permit manual movement thereof from the first or locked position to the second or unlocked position to disengage the first stanchion lock element 46 from the second stanchion lock element 148 to place the self propelled personal mobility vehicle lift 10 in the stored position when not in use.

The second stanchion lock element 148 comprises a substantially horizontal lock bar 166 fixed in spaced relationship below the stanchion mounting member 118 of the lift mounting assembly 28 by a substantially vertical interconnection member 168 to engage the notches 156 of the first stanchion lock element 46 to lock the stanchion or tower assembly 22 relative to the lift mounting assembly 28 when in the deployed configuration.

As best shown in FIGS. 2 and 7, the hoist assembly 30 comprises a hollow hoist member 170 having a hoist mechanism generally indicated as 172 attached to the outer end portion thereof and a plurality of hoist boom apertures generally indicated 174 formed through the mid portion 176 thereof. The boom hoist aperture 60 and the hoist boom apertures 174 together with a fastening means such as a hitchpin 178 cooperatively form a hoist boom adjustment means to secure the hollow hoist member 170 longitudinally relative to the upper hollow boom member 54 by aligning the boom hoist aperture 60 with one of the hoist boom apertures 174 and passing the fastening means of hitchpin 178 therethrough to selectively adjust the distance of the hoist mechanism 172 from the boom bracket 58. The hoist mechanism 172 comprises a reel or spool 180 disposed within a hoist housing 182 that supports a reversible electric motor 184 in operative relationship relative to the reel or spool 180 to selectively pay-out or retrieve a flexible hoist element 186 such as a strap or line having a hoist attachment means 187 such as a hook attached to the free end therof when the reel or spool 180 is rotated by the reversible electric motor 184 as described more fully hereinafter.

A control means generally indicated as 188 operatively couples the hoist assembly 30 to the power source of the self propelled personal mobility vehicle 18. In particular, the control means 188 comprises a control box 190 having logic means disposed therein to control the operation of the hoist mechanism 172 of the hoist assembly 30. A control switch 192 mounted on the control box 190 to actuate the logic means is coupled to the power source by a conductor 194 and to the reversible electric motor 184 of the hoist mechanism 172 by conductors 196 and 198. Alternately, the battery form the vehicle 14 or other external power source may be used in place of the self propelled personal mobility vehicle 18 power source.

To install the self propelled personal mobility vehicle lift 10, the hitch mounting member 114 is inserted into the hitch 16 with the stanchion mounting member 118 disposed toward the passenger side of the vehicle 14 and secured in place with a hitchpin or the like placed into the hitch mounting aperture 116. Of course, the stanchion mounting member 118 may be disposed toward the down side of the vehicle 14. The first and second adjustable interconnecting members 134 and 142 are connected between the safety chain loops on the hitch 16 and the apertures 138 and 146 respectively by corresponding connectors 140. The first and second adjustable interconnecting members 134 and 142 are then evenly tightened until the lift mounting assembly 28 is secured tightly against the hitch 16.

A self propelled personal mobility vehicle attachment means or docking device DD may be mounted to the self propelled personal mobility vehicle 18 to detachably couple the flexible hoist element 186 by the hook 187 to the self propelled personal mobility vehicle 18.

Because the self propelled personal mobility vehicle lift 10 has been designed for use with various many makes and models of vehicles 14, the self propelled personal mobility vehicle lift 10 must be adjusted to the particular vehicle 14.

To adjust the self propelled personal mobility vehicle lift 10 on a specific vehicle 14, the hitchpin 112 is removed from the stanchion support aperture 48 and the lift support assembly 26 is lowered until the support plate 104 touches the ground. Then the hitchpin 112 is placed in position by aligning the stanchion support aperture 48 with the nearest of the support stanchion apertures 108. The upper hollow boom member 54 is preset to a 30 degree position which is suitable for most vehicles 14. However, the inclination of the upper hollow boom member 54 may be adjusted by aligning the stop or limit member 96 with another corresponding pair of boom adjustment apertures 98.

Figure 3:
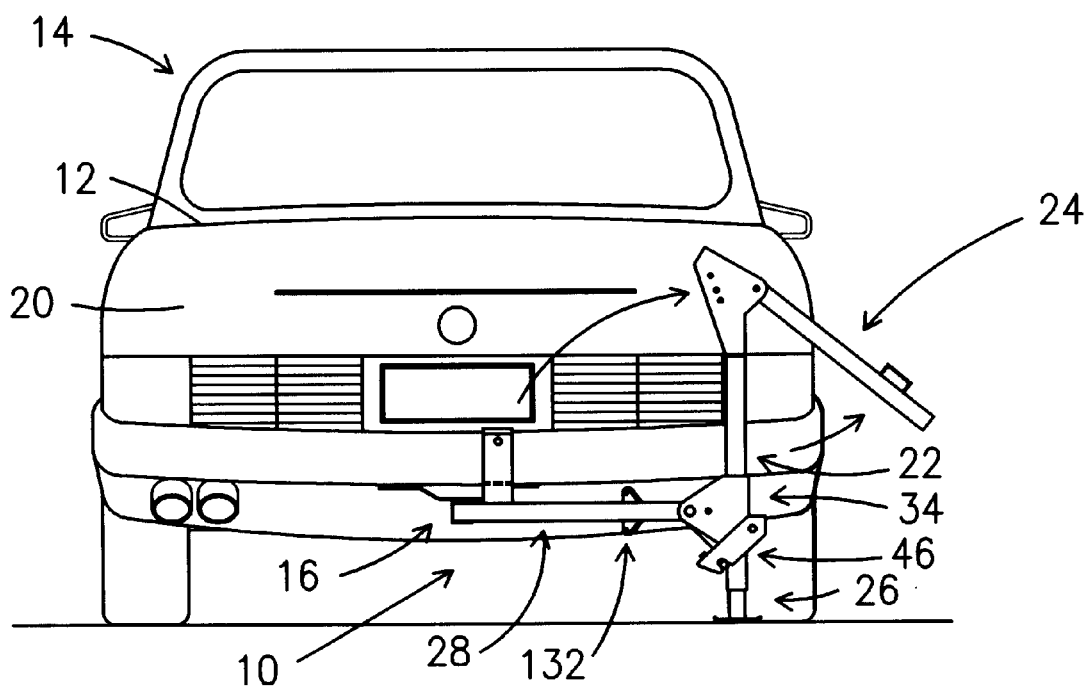
FIG. 3 is a rear view of the self propelled personal mobility vehicle lift of the present invention with the stanchion or tower assembly and the lift support assembly in the deployed configuration.

To deploy from the stored configuration as shown in FIG. 1, the stanchion or tower assembly 22 and the boom assembly 24 are pivoted upward relative to the lift mounting assembly 28 until the lock notches 156 of the first stanchion lock element 46 securely engages the substantially horizontal lock bar 166 of the second stanchion lock element 148 to lock the stanchion or tower assembly 22 in the deployed position as shown in FIG. 3. AS shown in FIG. 4, the upper hollow boom member 54 is pivoted on the boom bracket 58 until the upper hollow boom member 54 engages the upper boom member adjustment means 94 or the stop or limit member 96.

Figure 5:
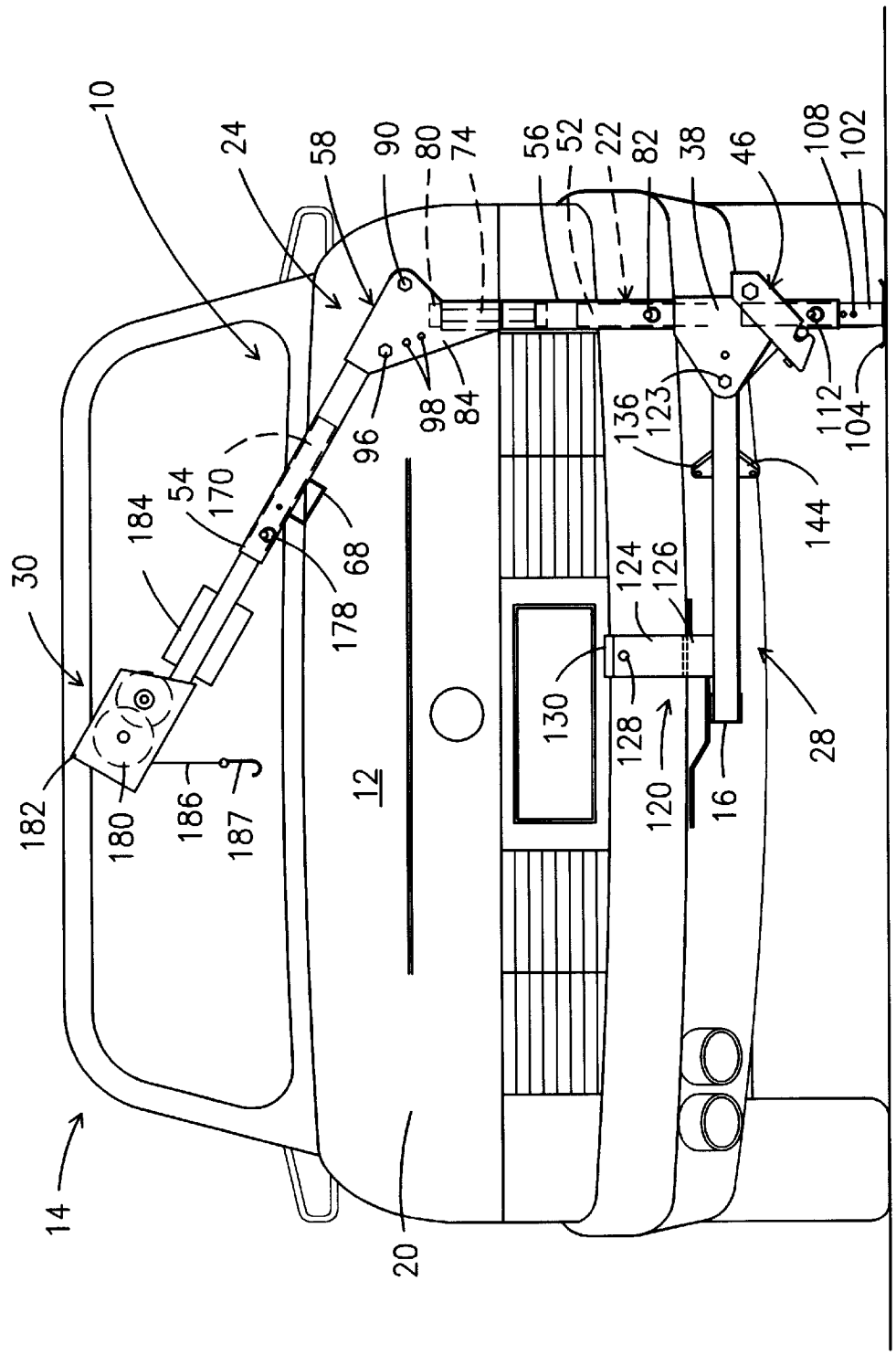
FIG. 5 is a rear view of the self propelled personal mobility vehicle lift of the present invention with the stanchion or tower assembly, the lift support assembly and the boom assembly in the deployed configuration with the hoist assembly operatively mounted to the boom assembly.
Figure 6:
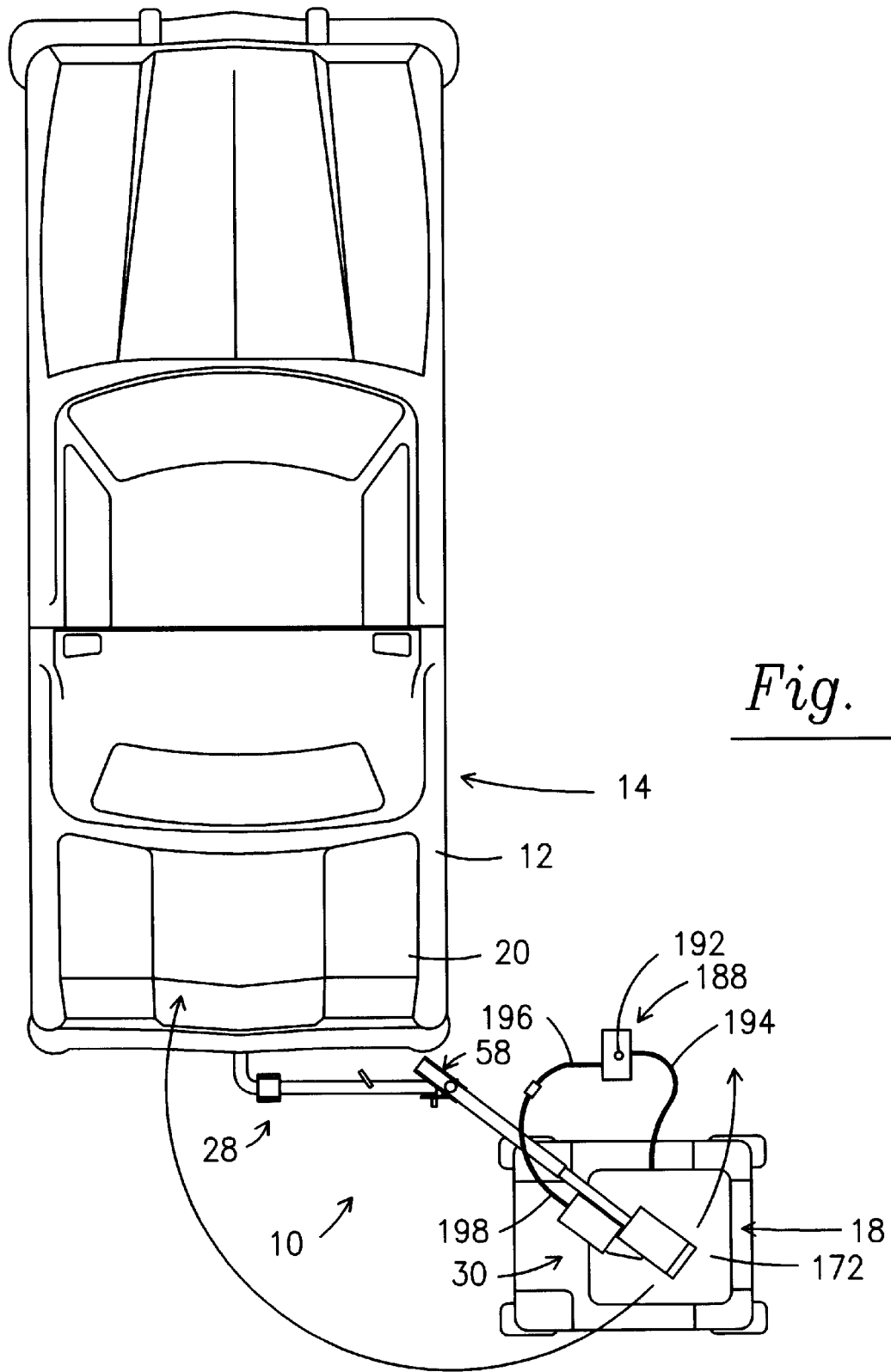
FIG. 6 is a top view of the self propelled personal mobility vehicle lift of the present invention in the fully deployed configuration.

The boom assembly 24 can be rotated on the stanchion or tower assembly 22 to position the upper hollow boom member 54 near the rear portion 12 of the vehicle 14 as shown in FIG. 6. AS shown in FIG. 5, the hollow hoist member 170 is inserted into the upper hollow boom member 54. The fastening means 178 is placed through the boom hoist aperture 60 and one of the hoist boom apertures 174 to secure the hollow hoist member 170 longitudinally relative to the upper hollow boom member 54.

To load the self propelled personal mobility vehicle 18 into the trunk 20 or the rear portion 12 of the vehicle 14, the self propelled personal mobility vehicle 18 is located parallel to the rear portion 12 of the vehicle 14 and centered on the hitch 16 as close as possible to the rear portion 12 of the vehicle 14. With the electric power of the self propelled personal mobility vehicle 18 off, the seat is removed from the seatpost. The control box 190 of the control means 188 is electrically coupled to the reversible electric motor 184 of the hoist assembly 30 by connecting conductors 196 and 198. In turn, the control box 190 of the control means 188 is electrically coupled to the self propelled personal mobility vehicle charger port by conductor 194.

The hoist attachment means 187 is lowered by operating the reversible electric motor 184 by control switch 192 rotating the reel or spool 180 to pay-out the flexible hoist element 186 until the hoist attachment means 187 engages the docking device DD to interconnect or couple the self propelled personal mobility vehicle lift 10 to the self propelled personal mobility vehicle 18.

The self propelled personal mobility vehicle 18 is then lifted by controlling the control switch 192 causing the reversible electric motor 184 to rotate the reel or spool 180 to retrieve the flexible hoist element 186.

Once the self propelled personal mobility vehicle 18 clears the top of the trunk 20, the hoist assembly 30 is rotated to maneuver the self propelled personal mobility vehicle 18 into the trunk 20 or the rear portion 12 of the vehicle 14. The self propelled personal mobility vehicle 18 is then lowered into the trunk 20 or the rear portion 12 of vehicle 14. The hoist attachment means 187 is released from the self propelled personal mobility vehicle 18 and the power disconnected.

The hoist assembly 30 is removed from the boom assembly 24 20 and stored in the trunk 20 or the rear portion 12 of the vehicle 14. Finally, the boom assembly 24 is pivoted against the stanchion or tower assembly 22, the stanchion lock means released and the stanchion or tower assembly 22, lift support assembly 26 and the boom assembly 24 returned to the store d position and secured.

Figure 8:
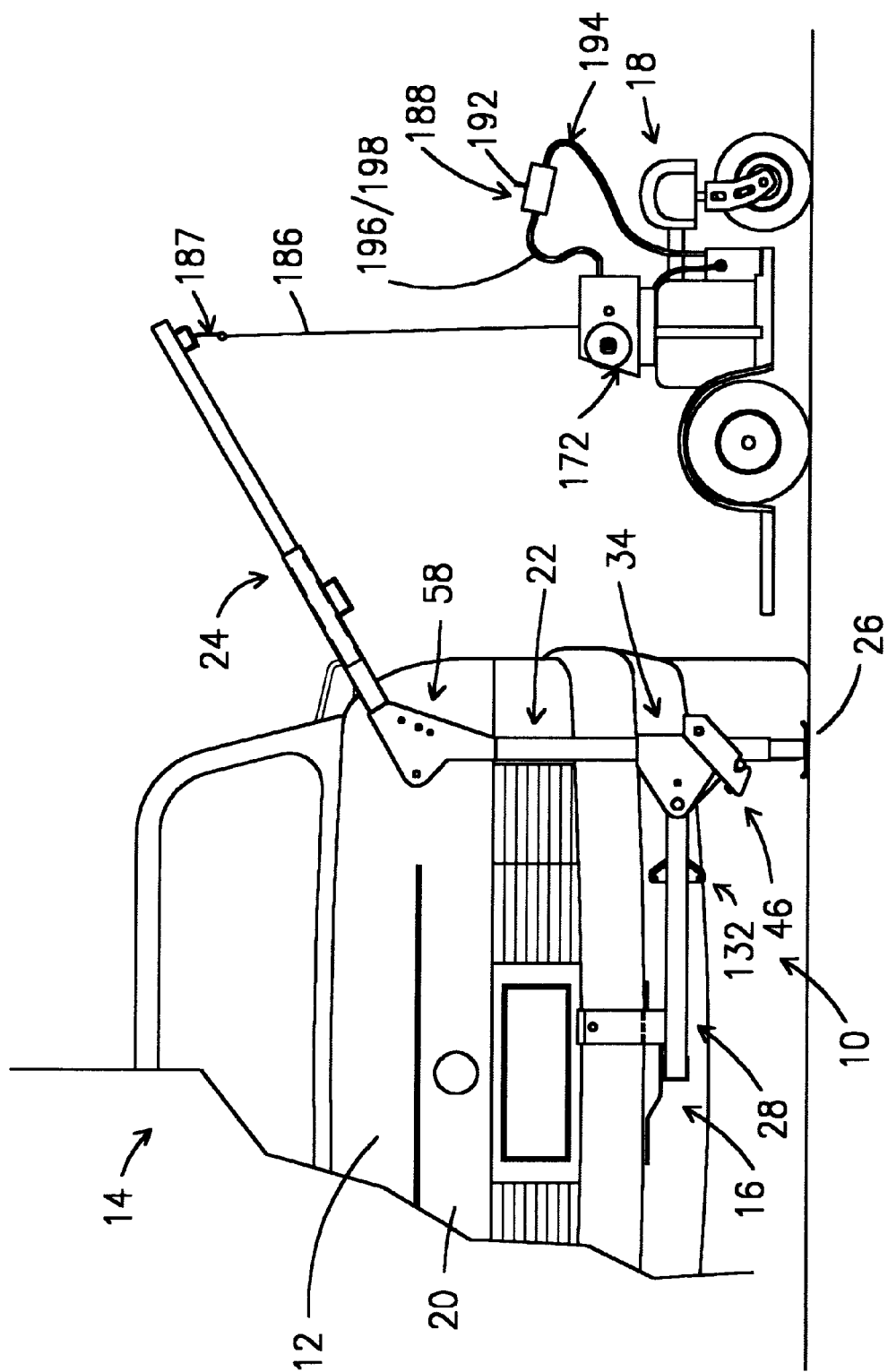
FIG. 8 is a view of an alternate embodiment of the self propelled personal mobility vehicle lift of the present invention.

FIG. 8 shows an alternate embodiment of the self propelled personal mobility vehicle lift 10 wherein the hoist mechanism 172 is operatively mounted on the self propelled personal mobility vehicle 18 rather than attached to the hollow hoist member 170 which has the self propelled personal mobility vehicle attachment means or docking device DD attached thereto. Otherwise the structure and operation is essentially the same as the embodiment shown in FIGS. 1 through 6.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense, It is also to be understood that the following claims are intended to cover all of the generic and specific features of the invention herein described, and all statements of the scope of the invention which, as a matter of language, might be said to fall herebetween.

Now that the invention has been described, what is claimed is:

1. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopically coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly and wherein a plurality of stanchion boom apertures is formed through a mid to upper portion of said hollow tower member and a boom stanchion aperture is formed through a lower portion of said boom assembly, said stanchion boom apertures and said boom stanchion aperture cooperatively form a boom stanchion adjustment means to secure said lower portion of said boom assembly longitudinally relative to said hollow tower member by aligning said boom stanchion aperture with one of said stanchion boom apertures and passing a fastener therethrough to selectively adjust the height of said boom assembly.

2. The personal mobility vehicle lift of claim 1 wherein said stanchion pivot bracket comprises a pair of stanchion bracket side plates attached to said hollow tower member each having a stanchion bracket aperture formed on the outer portion in spaced relationship to said hollow tower member to pivotally mount said tower assembly to said lift mounting assembly.

3. The personal mobility vehicle lift of claim 1 further including a boom bracket attachment member extending outwardly from an upper portion of said lower hollow boom member to cooperatively engage a boom bracket attachment element to rotatably couple said boom bracket and said upper hollow boom member to said lower hollow boom member.

4. The personal mobility vehicle lift of claim 3 wherein said boom bracket comprises a pair of boom bracket side plates having a boom bracket aperture formed through the rear portion of each said boom bracket side plate, said upper hollow boom member coupled to said boom bracket by passing a securing means through said boom bracket apertures and a boom bracket aperture formed on the outer portion of said upper hollow boom member securing said upper hollow boom member between said boom bracket side plates.

5. The personal mobility vehicle lift of claim 4 wherein said boom bracket further includes an upper boom member adjustment means disposed to engage said upper hollow boom member to selectively control the angle or inclination of said upper hollow boom member relative to said lower hollow boom member.

6. The personal mobility vehicle lift of claim 5 wherein said upper boom member adjustment means comprises a limit member extending through one of a plurality of boom adjustment apertures formed through the forward portion of each said boom bracket side plate to engage said upper hollow boom member when in the deployed configuration.

7. The personal mobility vehicle lift of claim 1 wherein said lift support assembly comprises a hollow support member having a support plate attached to a lower portion thereof.

8. The personal mobility vehicle lift of claim 7 wherein said lift mounting assembly comprises a hitch mounting member and a stanchion mounting member disposed substantially perpendicular thereto formed on the outer end portion thereof.

9. The personal mobility vehicle lift of claim 8 further including a lift mount securing means to secure and stabilize said personal mobility vehicle lift to the vehicle.

10. The personal mobility vehicle lift of claim 9 wherein said lift mount securing means comprises a first securing assembly including a first adjustable interconnecting member coupled between a first securing plate having a securing aperture formed therethrough extending upwardly from said stanchion mounting member and said vehicle by a connector attached to each end portion of said first interconnecting member.

11. The personal mobility vehicle lift of claim 10 further including a second securing assembly including a second adjustable interconnecting member coupled between a second securing plate having a securing aperture formed therethrough extending downwardly from said stanchion mounting member and the vehicle by a connector attached to each end portion of said second interconnecting member.

12. The personal mobility vehicle lift of claim 8 further including a stanchion support means comprising a pair of substantially parallel side support plates extending upwardly from said stanchion mounting member to receive said hollow tower member when said personal mobility vehicle lift is in the stored configuration.

13. The personal mobility vehicle lift of claim 12 further including a stanchion support member disposed between said substantially parallel side support plates to engage an upper portion of said hollow tower member when the personal mobility vehicle lift in the stored configuration to hold said hollow tower member and said stanchion mounting member in spaced relationship relative to each other such that said upper hollow boom member is disposed between the side support plates.

14. The personal mobility vehicle lift of claim 13 wherein a stanchion lock aperture is formed in the upper portion of each said side support plate such that a pin placed through said stanchion lock apertures locks said personal mobility vehicle lift in the stored configuration.

15. The personal mobility vehicle lift of claim 14 where an upper portion of each said side support plate includes a stanchion cam inclined outwardly to guide said upper hollow boom member between said substantially parallel side support plates.

16. The personal mobility vehicle lift of claim 8 further including a stanchion lock means to lock said tower assembly in position when said personal mobility vehicle lift is in said deployed configuration.

17. The personal mobility vehicle lift of claim 16 wherein said stanchion lock means comprises a first stanchion lock element coupled to said tower assembly and a second stanchion lock element coupled to said lift mounting assembly.

18. The personal mobility vehicle lift of claim 17 wherein said first stanchion lock element comprises a pair of stanchion lock side plates each formed on one end portion thereof and a lock notch formed on an opposite end portion thereof to engage said second stanchion lock element, said first stanchion lock element pivotally coupled to said stanchion pivot bracket by passing a securing means through said stanchion lock aperture and a stanchion lock mounting member securing said first stanchion lock element to the stanchion pivot bracket, and said second stanchion lock element comprises a substantially horizontal lock bar fixed in spaced relationship below said stanchion mounting member to engage said notches of said first stanchion lock element to lock said tower assembly relative to said lift mounting assembly when said vehicle lift is in the deployed configuration.

19. The personal mobility vehicle lift of claim 18 wherein said stanchion lock means further includes a positioning means operatively coupled to said first stanchion lock element to engage said hollow tower member to maintain said first stanchion lock element in a locked position.

20. The personal mobility vehicle lift of claim 19 further including a lock movement member formed on said first stanchion lock element to permit manual movement thereof from said locked position to an unlocked position to disengage said first stanchion lock element from said second stanchion lock element to place said personal mobility vehicle lift in the stored position when not in use.

21. The personal mobility vehicle lift of claim 8 wherein said hoist assembly includes a hollow hoist member having said hoist mechanism attached to an outer end portion thereof.

22. The personal mobility vehicle lift of claim 21 further including a plurality of hoist boom apertures formed through a mid portion of said hollow hoist member and a boom hoist aperture formed through an outer portion of said upper hollow boom member to secure said hollow hoist member longitudinally relative to said upper hollow boom member by aligning said boom hoist aperture with one of said hoist boom apertures and passing said fastener therethrough to selectively adjust the distance of said hoist mechanism from said boom bracket.

23. The personal mobility vehicle lift of claim 21 wherein said hoist mechanism comprises a reel to operatively receive and support said flexible hoist element thereon coupled to said reversible motor to selectively pay-out or retrieve said flexible hoist element.

24. The personal mobility vehicle lift of claim 23 further including a hoist attachment means attached to a free end of said flexible hoist element.

25. The personal mobility vehicle lift of claim 23 wherein said control means comprises a control box having logic means disposed therein to control the operation of said hoist mechanism having a control switch mounted thereon to actuate said logic means, said control means coupled to the power source of the self-propelled personal mobility vehicle and said reversible motor of said hoist mechanism.

26. The personal mobility vehicle lift of claim 25 wherein said power source comprises the power source of the personal mobility vehicle.

27. The personal mobility vehicle lift of claim 8 wherein said hoist assembly includes a hoist member having an attachment means and a hoist mechanism attached to the personal mobility vehicle.

28. The personal mobility vehicle lift of claim 27 further including a plurality of hoist boom apertures formed through a mid portion of said hoist member and a boom hoist aperture formed through an outer portion of said upper hollow boom member to secure said hoist member longitudinally relative to said upper hollow boom member by aligning said boom hoist aperture with one of said hoist boom apertures and passing said fastener therethrough to selectively adjust the distance of said hoist mechanism from said boom bracket.

29. The personal mobility vehicle lift of claim 27 wherein said hoist mechanism comprises a reel to operatively receive and support said flexible hoist element thereon coupled to said reversible motor to selectively pay-out or retrieve said flexible hoist element.

30. The personal mobility vehicle lift of claim 29 further including a hoist attachment means attached to the free end of said flexible hoist element.

31. The personal mobility vehicle lift of claim 29 wherein said control means comprises a control box having logic means disposed therein to control the operation of said hoist mechanism having a control switch mounted thereon to actuate said logic means, said control means coupled to the power source and said reversible motor of said hoist mechanism.

32. The personal mobility vehicle lift of claim 31 wherein said power source comprises the power source of the self propelled personal mobility vehicle.

33. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly and said lift support assembly comprises a hollow support member having a support plate attached to a lower portion thereof, wherein a plurality of support stanchion apertures is formed through a mid to upper portion of said hollow support member and a stanchion support aperture is formed through a lower portion of said hollow tower member to cooperatively form a support stanchion adjustment means to secure said hollow support member longitudinally relatively to said hollow tower member by aligning said stanchion support aperture with one of said support stanchion apertures and passing a fastening means therethrough to selectively adjust the height of said lift support assembly such that said support plate rests on the ground to support said personal mobility vehicle lift thereon.

34. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly, said lift support assembly comprises a hollow support member having a support plate attached to a lower portion thereof, said lift mounting assembly comprises a hitch mounting member having an outer end portion and a stanchion mounting member disposed substantially perpendicular thereto formed on the outer end portion of said hitch mounting member, further including a stanchion support means comprising a pair of substantially parallel side support plates extending upwardly from said stanchion mounting member to receive said hollow tower member when said personal mobility vehicle lift is in the stored configuration and a stanchion support member disposed between said substantially parallel side support plates to engage an upper portion of said hollow tower member when said personal mobility vehicle lift is in the stored configuration to hold said hollow tower member and said stanchion mounting member in spaced relationship relative to each other such that said upper hollow boom member is disposed between said side support plates.

35. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly, said boom assembly comprises an upper hollow boom member pivotally coupled to a lower hollow boom member by a boom bracket, said lift support assembly comprises a hollow support member having a support plate attached to a lower portion thereof, said lift mounting assembly comprises a hitch mounting member having an outer end portion and a stanchion mounting member disposed substantially perpendicular thereto formed on the outer end portion of said hitch mounting member and further including a lift mount securing means to secure and stabilize said personal mobility vehicle lift to the vehicle, said lift mount securing means comprises a first securing assembly including a first adjustable interconnecting member coupled between a first securing plate having a securing aperture formed therethrough extending upwardly from said stanchion mounting member and said vehicle by a connector attached to each end portion of said first interconnecting member.

36. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly, said lift support assembly comprises a hollow support member having a support plate attached to a lower portion thereof, said lift mounting assembly comprises a hitch mounting member having an outer end portion and a stanchion mounting member disposed substantially perpendicular thereto formed on the outer end portion of said hitch mounting member and further including a stanchion lock means to lock said tower assembly in position when said personal mobility vehicle lift is in said deployed configuration, said stanchion lock means comprises a first stanchion lock element coupled to said tower assembly and a second stanchion lock element coupled to said lift mounting assembly.

37. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly, said boom assembly comprises an upper hollow boom member pivotally coupled to a lower hollow boom member by a boom bracket, said lift support assembly comprises a hollow support member having a support plate attached to a lower portion thereof, said lift mounting assembly comprises a hitch mounting member having an outer end portion and a stanchion mounting member disposed substantially perpendicular thereto formed on the outer end portion of said hitch mounting member, said hoist assembly includes a hollow hoist member having said hoist mechanism attached to an outer end portion thereof, further including a plurality of hoist boom apertures formed through a mid portion of said hollow hoist member and a boom hoist aperture formed through an outer portion of said upper hollow boom member to secure said hollow hoist member longitudinally relative to said upper hollow boom member by aligning said boom hoist aperture with one of said hoist boom apertures and passing a fastener therethrough to selectively adjust the distance of said hoist mechanism from said boom bracket.

38. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly, said lift support assembly comprises a hollow support member having a support plate attached to a lower portion thereof, said lift mounting assembly comprises a hitch mounting member having an outer end portion and a stanchion mounting member disposed substantially perpendicular thereto formed on the outer end portion of said hitch mounting member, said hoist assembly includes a hollow hoist member having said hoist mechanism attached to an outer end portion thereof, and further including a hoist attachment means attached to a free end of said flexible hoist element, said control means including logic means to control the operation of said hoist mechanism, said control means having a control switch to selectively actuate said logic means, said control means coupled to the power source and said reversible motor of said hoist mechanism.

39. A personal mobility vehicle lift operable in a stored configuration and a deployed configuration mounted to the rear portion of a vehicle to selectively lift and remove a self-propelled personal mobility vehicle into and from the rear portion of the vehicle, said personal mobility vehicle lift includes a tower assembly including an upper and lower portion pivotally mounted to a lift mounting assembly secured to the vehicle, a boom assembly to support a hoist assembly thereon and a lift support assembly to support said personal mobility vehicle lift when deployed telescopingly coupled to the upper and lower portions of said tower assembly respectively, said hoist assembly includes a hoist mechanism including a reversible motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, said tower assembly comprises a hollow tower member having a stanchion pivot bracket attached thereto to pivotally mount said tower assembly to said lift mounting assembly, said lift support assembly comprises a hollow support member having a support plate attached to a lower portion thereof, said lift mounting assembly comprises a hitch mounting member having an outer end portion and a stanchion mounting member disposed substantially perpendicular thereto formed on the outer end portion of said hitch mounting member, said hoist assembly includes a hoist member having an attachment means and said hoist mechanism is attached to the self-propelled personal mobility vehicle.

40. A personal mobility vehicle lift operable in a stored configuration and a deployed configuration mounted to the rear portion of a vehicle to selectively lift and remove a self-propelled personal mobility vehicle including a power source into and from the rear portion of the vehicle, said personal mobility vehicle lift includes a tower assembly including an upper and lower portion pivotally mounted to a lift mounting assembly secured to the vehicle, a boom assembly comprising a lower hollow boom member rotatably coupled to said upper portion of said tower assembly and an upper hollow boom member pivotally coupled to said lower boom member to support a hoist assembly thereon and a lift support assembly to support said personal mobility vehicle lift when deployed telescopingly coupled to the upper and lower portions of said tower assembly respectively, said hoist assembly includes a hoist mechanism including a motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle, wherein said upper hollow boom member is pivotally coupled to said lower hollow boom member by a boom bracket.

41. The personal mobility vehicle lift of claim 40 further including means to adjust the longitudinal position of said boom assembly relative to said tower assembly to control the height of said hoist assembly.

42. The personal mobility vehicle lift of claim 41 wherein said means to adjust the height of said hoist assembly comprises a plurality of stanchion boom apertures formed through a mid to said upper portion of said tower assembly and at least one boom stanchion aperture is formed through a lower portion of said boom assembly, said stanchion boom apertures and said boom stanchion aperture cooperatively form said adjustment means to secure said boom assembly longitudinally relative to said tower assembly by aligning said boom stanchion aperture with one of said stanchion boom apertures and passing a fastener therethrough to selectively adjust the height of said hoist assembly.

43. A personal mobility vehicle lift operable in a stored configuration and a deployed configuration mounted to the rear portion of a vehicle to selectively lift and remove a self-propelled personal mobility vehicle including a power source into and from the rear portion of the vehicle, said personal mobility vehicle lift includes a tower assembly including an upper and lower portion pivotally mounted to a lift mounting assembly secured to the vehicle, a boom assembly comprising a lower boom member rotatably coupled to said upper portion of said tower assembly and an upper boom member pivotally coupled to said lower boom member to support a hoist assembly thereon and a lift support assembly to support said personal mobility vehicle lift when deployed telescopingly coupled to the upper and lower portions of said tower assembly respectively, said hoist assembly includes a hoist mechanism including a motor coupled to a power source through a control means and having a flexible hoist element to couple said personal mobility vehicle lift to the self-propelled personal mobility vehicle when said personal mobility vehicle lift is in the deployed configuration to selectively lift or lower the self-propelled personal mobility vehicle into or from the rear portion of the vehicle and means to adjust the longitudinal position of said boom assembly relative to said tower assembly to control the height of said hoist assembly.

44. The personal mobility vehicle lift of claim 43 wherein said tower assembly includes a plurality of stanchion boom apertures formed through a mid to said upper portion thereof and, said boom assembly includes a boom stanchion aperture formed through a lower portion thereof, said stanchion boom apertures and said boom stanchion aperture cooperatively form said adjustment means to secure said boom assembly longitudinally relative to said tower assembly by aligning said boom stanchion aperture with one of said stanchion boom apertures and passing a fastener therethrough to selectively adjust the height of said hoist assembly.

* * * * *